(12) United States Patent
Pfister et al.

(10) Patent No.: US 9,975,297 B2
(45) Date of Patent: May 22, 2018

(54) METHOD AND DEVICE OF LAYERWISE MANUFACTURING A THREE-DIMENSIONAL OBJECT OF A POWDERY MATERIAL

(75) Inventors: Andreas Pfister, Munich (DE); Mandy Gersch, Ulm (DE)

(73) Assignee: EOS GmbH Electro Optical Systems, Krailling (DE)

( * ) Notice: Subject to any disclaimer, the term of this patent is extended or adjusted under 35 U.S.C. 154(b) by 989 days.

(21) Appl. No.: 12/387,651

(22) Filed: May 4, 2009

(65) Prior Publication Data

US 2009/0291308 A1 Nov. 26, 2009

(30) Foreign Application Priority Data

May 21, 2008 (DE) ........................ 10 2008 024 465

(51) Int. Cl.
| | |
|---|---|
| *B32B 27/16* | (2006.01) |
| *B32B 27/34* | (2006.01) |
| *B29C 67/00* | (2017.01) |
| *B33Y 30/00* | (2015.01) |
| *B33Y 70/00* | (2015.01) |
| *B33Y 40/00* | (2015.01) |
| *B29B 17/00* | (2006.01) |

(52) U.S. Cl.
CPC ...... *B29C 67/0096* (2013.01); *B29B 17/0005* (2013.01); *B29C 67/0077* (2013.01); *B33Y 30/00* (2014.12); *B33Y 40/00* (2014.12); *B33Y 70/00* (2014.12); *Y02W 30/62* (2015.05); *Y10T 428/2982* (2015.01)

(58) Field of Classification Search
USPC ....... 428/402, 474.4; 523/328; 528/499, 503
See application file for complete search history.

(56) References Cited

U.S. PATENT DOCUMENTS

| | | | | |
|---|---|---|---|---|
| 4,334,056 | A | * | 6/1982 | Meyer et al. ................. 528/496 |
| 4,938,816 | A | | 7/1990 | Beaman et al. |
| 5,527,877 | A | * | 6/1996 | Dickens et al. .............. 528/323 |
| 5,990,268 | A | * | 11/1999 | Dickens et al. .............. 528/323 |
| 6,245,281 | B1 | * | 6/2001 | Scholten et al. ............. 264/497 |
| 7,468,405 | B2 | * | 12/2008 | Allen et al. .................. 523/328 |

(Continued)

FOREIGN PATENT DOCUMENTS

| | | |
|---|---|---|
| DE | 101 05 504 | 8/2002 |
| DE | 10 2004 047 876 | 4/2006 |

(Continued)

*Primary Examiner* — Hoa T Le
(74) *Attorney, Agent, or Firm* — Locke Lord LLP; Scott D. Wofsy; Nicholas J. DiCeglie, Jr.

(57) ABSTRACT

A polyamide powder is disclosed for use in a method of manufacturing a three-dimensional object by selectively solidifying layers of the polyamide powder at the locations corresponding to the cross-section of the object in the respective layer by application of electromagnetic radiation. The polyamide powder of the invention is reclaimed after manufacturing of an object and, then is treated with water or water vapor and subsequently dried. After treatment, the powder preferably can have a molar weight Mn (numeric average) of more than about 20,000 g/mol and a Mw (weight average) of more than about 40,000 g/mol. Also, the powder preferably has an excess of carboxylic end groups relative to amino end groups of at least 4:1 up to at most 200:1.

14 Claims, 3 Drawing Sheets

(56) References Cited

U.S. PATENT DOCUMENTS

| | | | |
|---|---|---|---|
| 7,491,792 B2 * | 2/2009 | Monsheimer et al. | 528/480 |
| 7,794,647 B1 * | 9/2010 | Deckard | 264/497 |
| 2004/0102539 A1 * | 5/2004 | Monsheimer et al. | 522/2 |
| 2004/0138344 A1 | 7/2004 | Allen et al. | |
| 2005/0074550 A1 | 4/2005 | Leuterer et al. | |
| 2006/0071359 A1 * | 4/2006 | Monsheimer et al. | 264/113 |
| 2007/0241482 A1 * | 10/2007 | Giller et al. | 264/494 |
| 2009/0045553 A1 | 2/2009 | Weidinger et al. | |

FOREIGN PATENT DOCUMENTS

| | | |
|---|---|---|
| DE | 10 2006 023 484 | 11/2007 |
| EP | 1 413 595 | 4/2004 |
| EP | 0 911 142 | 8/2005 |
| JP | 11-216779 | 8/1999 |
| JP | 2004-143460 | 5/2004 |
| JP | 2004-524995 | 8/2004 |
| WO | WO-2005/097475 | 10/2005 |

* cited by examiner

METHOD AND DEVICE OF LAYERWISE MANUFACTURING A THREE-DIMENSIONAL OBJECT OF A POWDERY MATERIAL

FIELD OF THE INVENTION

The invention relates a method and device of layerwise manufacturing a three-dimensional object of a powdery material. In particular, the invention relates to a method of selective laser sintering, that is a "laser sintering method" as used herein, and to a laser sintering device, which can manufacture a three-dimensional object of plastic powder, in particular of polyamide, in a cost-saving and environmentally friendly manner.

BACKGROUND OF THE INVENTION

A laser sintering method of manufacturing a three-dimensional object by selectively solidifying of layers of a plastic powder material at locations corresponding to the cross-section of the object in the respective layer by impact of electromagnetic radiation, and a laser sintering device for manufacturing a three-dimensional object by selectively solidifying layers of a powdery material at locations corresponding to the cross-section of the object in the respective layer by impact of electromagnetic radiation, respectively, are known from DE 101 05 504 A1, for instance. In the method, in particular a plastic powder such as polyamide is used. Herein, polyamide 12 having a melting point of 185-189° C., an enthalpy of fusion of 112±17 kJ/mol and a solidification temperature of 138-143° C. is very suitable, as it is described in EP-0 911 142. The powder has an average grit size of 50-150 μm.

In the known method, a built-up process uses a certain amount of waste powder, that is, a powder remaining as non-sintered powder of one or several previous built-up processes.

Due to the stay in the process chamber during manufacturing of the three-dimensional object, the non-solidified powder is thermically and/or thermooxidatively damaged so that it has other material properties and also other processing parameters than fresh powder. Therefore, it can be mixed up with fresh powder only in a certain percentage, without compromising the built-up process and the building quality. The so-called fresh-up rate is the ratio between fresh powder and waste powder of the powder to be used in the built-up process. It should be as low as possible, since the costs for the fresh powder can be saved.

In DE 101 05 504 A1, a pre-treatment of the waste powder or of a mixture of waste powder and fresh powder before solidifying by liquefaction is proposed, so as to reduce the effects of aging damages and to enable admixing more waste powder. However, the pre-treatment by liquefaction does not remove all aging damages of the powder. In particular, a high ratio of waste powder causes unsatisfying surface properties of outer walls of the object by so-called pockmarks, which are also termed as "sink marks" or "orange peel".

From WO 2005/097475 and DE 10 2004 047876 A1, laser sintering methods and laser sintering devices are known, which reduce the problem of pockmarks by using a determined material having increased stability in the laser sintering process and, thus, less aging damages, as it is used as waste powder. For instance, the powder according to DE 10 2004 047876 A1 is characterized in that it comprises a mixture of diamide- and diamine-controlled polyamide and/or co-polyamide. However, the user is forced to use this specific powder, which has in turn other properties than the previously used habitual powder and probably does not fulfil all requirements.

From DE 10 2006 023 484.7, it is further known that the problem of pockmarks is removed by mechanically compressing the powder building material during application of a layer. This requires a specific dispenser. From US 2004/0138344 A1, it is known to increase the melting point and the enthalpy of fusion of polyamide by contacting the polyamide with water or water vapour. Thereby, some polyamide can be made suitable for laser sintering.

It is the object of the invention to provide a method and a device of manufacturing a three-dimensional object and, in particular, a laser sintering method and a laser sintering device, which can reduce the fresh-up rate and, therefore, the costs of the method, and which can enhance the environmental compatibility as well.

SUMMARY OF THE INVENTION

This object is achieved by a method of manufacturing a three-dimensional object by selectively solidifying of layers of a powdery material (3a) at locations corresponding to the cross-section of the object (3) in the respective layer by impact of electromagnetic radiation (7a), wherein a plastic powder is used as powder, characterized in that non-solidified powder (3a') is subjected to a treatment with water or water vapour after manufacturing the object and thereafter used again to build-up a new object.

This object is achieved by a device for manufacturing a three-dimensional object by selectively solidifying layers of a powdery material (3a) at locations corresponding to the cross-section of the object (3) in the respective layer by impact of electromagnetic radiation (7a), comprising
    a radiation source (7) for the electromagnetic radiation,
    a building space (10) having a platform (2) whereon the object (3) is built-up, and
    a dispenser (5) to apply layers of the powdery material onto the platform or onto a previously solidified layer, characterized by a device for treatment (12) of non-solidified powder by water or water vapour after manufacturing the object.

Further developments of the invention include methods having one or more of the following features:
    polyamide is used as powder;
    the treatment is performed at increased temperature;
    the powder is dried after the treatment;
    the time of the treatment is selected in accordance to the age of the powder;
    polyamide 12 is used as powder, and the treatment is carried out with hot vapour at a temperature of about 130° C. up to about 170° C., and preferably of 130° C. up to about 150° C.;
    the powder includes additives such as ripple additives, fillers, pigments or flame resistants; and/or
    laser radiation (7a) is used as electromagnetic radiation.

Other developments of the invention include devices having one or more of the following features:
    the device for treatment (12) comprises a separate container;
    a storage container (6) is provided for the powdery material and the device for treatment is provided in or at the storage container;
    a return means for returning the non-solidified powder from the building space into the storage container is provided;

and/or a drying means for drying the treated powder is provided.

The method according to the invention has the advantage that a conventional plastic powder for laser sintering such as polyamide-12, as it is known from the above mentioned EP-0 911 142, can be used, wherein the properties thereof are well-known.

The method can be performed in common plastic laser sintering devices. The treatment of the waste powder can be conducted in a separate container at the site of the laser sintering machine or in a central recycling site. Therefore, no complicated retro fitting of existing machines is required. The separate container for treatment of the waste powder can also be used as an additional device for the existing laser sintering machine.

The treatment of the waste powder is cost-saving and environmentally friendly since no specific chemicals are used. Consequently, the environmental compatibility of the laser sintering method can be enhanced by the method according to the present invention, in which no or only a few useless waste powder ends up in garbage.

The treatment of the waste powder is more cost-saving than manufacturing of fresh powder, and it is also economical for small powder amounts. Therefore, the costs of the laser sintering method can be lowered.

BRIEF DESCRIPTION OF THE DRAWINGS

Further features and effects of the invention are indicated in the description of an embodiment on the basis of the following figures.

DETAILED DESCRIPTION OF THE INVENTION

Figure 1:
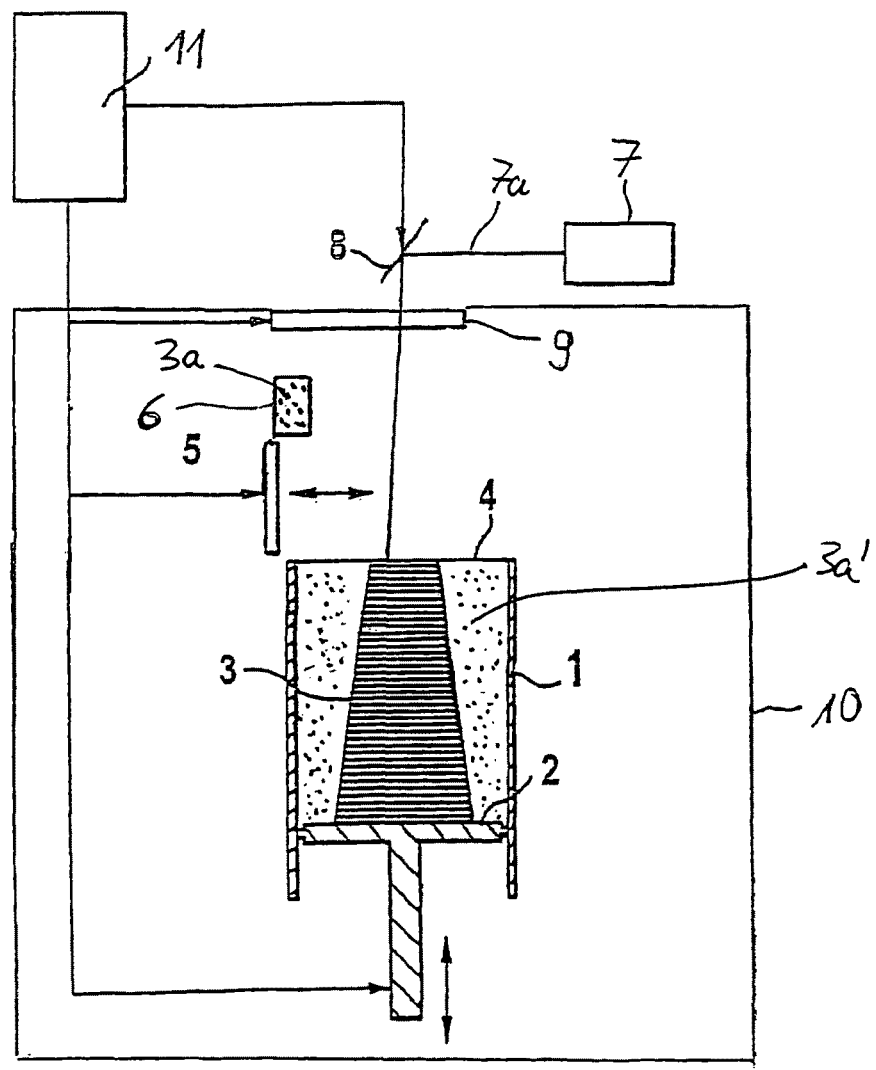
FIG. 1 shows a schematic view of an embodiment of the invention exemplified by a laser sintering device.

The laser sintering device according to FIG. 1 comprises a frame 1 which opens in the upper side and has therein a platform 2, which is movable in the vertical direction and supports the object 3 to be built-up and defines a building area. The platform 2 is adjusted in the vertical direction such that the layer of the object, which is to be solidified, lies in a working plane 4. Further, a dispenser 5 is provided to apply powdery building material 3a which is to be solidified by electromagnetic radiation. The building material 3a is supplied to the dispenser 5 from a storage container 6. Further, the device comprises a laser 7 generating a laser beam 7a, which is deflected by a deflection means 8 into an input window 9 and therefrom into the process chamber 10, and which is focussed to a predetermined point within the working plane 4.

Further, a control unit 11 is provided to control the components of the device in a coordinated manner to perform the building process.

Outside the process chamber 10, a device 12 for treating non-solidified waste powder is provided. This device comprises a water vapour generating means (not shown), a heating means to bring the water vapour on a predetermined temperature and a drying means. The device for treating the waste powder 12 can be an autoclave, for instance. The drying means can be a hot air blower, for instance. The device for treating the waste powder further comprises a control (not shown) to adjust the temperature and the time of the treatment.

The device 12 for treating the waste powder can optionally be connected with the process chamber and the storage container via a deliver system (not shown). Thereby, the non-solidified waste powder can be sucked and supplied again to the storage container after the treatment. The device 12 for treating the waste powder is optionally connected only with the storage container, so that the waste powder is supplied after removal of the object with the surrounding non-solidified material. In a further modification, the device 12 for treating the waste powder can also be integrated in the storage container.

Optionally, the post treatment of the waste powder in the open frame (1) together with the pieces is conducted after the job. Herein, the complete open frame (replaceable frame) is removed from the laser sintering machine and subjected the post treatment process in a device 12.

In a further modification, the device 12 for treating the waste powder is provided at a farther place, and the waste powder can be transported thereto and transported back to the laser sintering machine after the treatment as well.

In the following, the method according to the invention is described. Preferably, polyamide-12 is used as the powder, as it is described in EP 0 911 142. The powder usually has a grit size of about 50 µm to about 150 µm. The powder may have additives such as riddle additives, pigments, fillers, flame resistants or further additives.

The powder 3a is applied layer by layer from the storage container 6 onto the platform and onto a previously solidified layer, respectively, and solidified by the laser at the locations in the layer corresponding to the cross-section of the object. After manufacturing the object, non-sintered powder 3a' surrounding the object is supplied to the device 12 for treatment of waste powder. Here, it is treated by water vapour for about 1 up to about 48 hours at temperatures of at least 130° C. and at most 10° C. below the melting point of the powder. For polyamide-12 and polyamide-11, the treatment is preferably performed at about 130° C. up to about 170° C. Thereafter, it is dried in a drying cabinet, which is part of the device 12. At the same time, the drying temperature is lower than 100° C., preferably between 50-70° C. The time and the temperature of the treatment depends on the age of the waste powder. The older the powder is, as the case may be when it has been used for some manufacturing processes before, the longer it must be treated. By increasing the temperature, the recovery can be accelerated. However, the required temperature is below the melting points so as to prevent baking of the powder grains.

By aging in the laser sintering process, the molar mass of the polyamide is aggregated by post-condensation. The waste powder 3a' supplied to the treatment device 12 has a noticeable higher molar weight than fresh powder. In accordance to the age and the temperature load, the molar weight of the waste powder is increased. For instance, the waste powder according to the present invention before the treatment has a molar weight $M_n$ (numeric average) of more than 20.000 g/mol, preferably of 21.000-100.000 g/mol, further preferred of 22,000-50,000 and most preferred of 25,000-35,000, and $M_w$ (average weight) of more than 40.000 g/mol, preferably of 45,000-200,000, further preferred of 50.000-150.000 and most preferred of 60,000-100,000. After the treatment, the recycled powder has a molar weight, which is at least 5%, preferably 10-70% and further preferred 20-50% below the molar weight of the waste powder. The recycled powder has an $M_n$ (numeric average) of less than 40,000 g/mol, preferably of 15,000-30,000 g/mol, further preferred of 17,000-25,000 and most preferred of 19,000-21,000, and $M_w$ (weight average) of less than 100,000 g/mol, preferably of 35,000-70,000 and further preferred of 37,000-50,000 and most preferred of 38,000-45,000.

By aging during the laser sintering process, the balance between carboxylic end groups and amino end groups of polyamide-12 in a direction to an excess of one of both end groups, preferably of the carboxylic end group, can be shifted. The waste powder 3a' supplied to the treatment device 12 has preferably an excess of one end group, preferably of the carboxylic end group, at least of 4:1 up to at most 200:1. In accordance to the age of the powder, the excess can be 4:1, 5:1, etc., 100:1 up to 200:1. By the treatment, the excess of end groups is preferably decreased.

Further preferred, the excess of the end groups, preferably of the carboxylic end group, is set between about 2:1 to about 3:1.

A concrete embodiment uses a powder which is available under the trade name "Primepart" of EOS GmbH Electro Optical Systems, and which corresponds to the powder as described in EP-0 911 142 and has further additives. Fresh powder, which has not been used in a laser sintering process yet, usually has the following parameters: molar mass (numeric average) $M_n$=19,600 g/mol, molar mass (weight average) $M_w$=42,500 (g/mol). After the sintering process, the waste powder has the following parameters: $M_n$=27,200 g/mol, $M_w$=85,600 g/mol. This waste powder is treated for different times in the treatment device by hot vapour of 140° C. and, thereafter, it is dried. The treated waste powder has then values as indicated in the table. In accordance to the treatment time, it is possible to reset the molar weight of the fresh powder. It does not depend on the molar weight of the fresh powder and of the waste powder, respectively. Therefore, it is not essential whether the waste powder comes from one cycle or several cycles.

| | molar mass determination (GPC) | |
|---|---|---|
| Samples | Mn | Mw |
| fresh powder | 19500 | 42600 |
| waste powder | 27200 | 85600 |
| 140° C., 1 h | 25800 | 77100 |
| 140° C., 6 h | 24500 | 70300 |
| 140° C., 12 h | 20300 | 54000 |
| 140° C., 24 h | 19100 | 48600 |

The values have been determined by means of gel permeation chromatography (GPC) in hexafluoroisopropanol. The determination of the molar mass has been performed computer-aided by means of the so-called strip method. Herein, the eluted peak is divided in several equidistant volume slices which are identical with the measurement frequency. By the calibration, the elution volumes are then transformed to molar masses. As a calibration step standard, tightly distributed polymethyl methacrylate (PMMA) dissolved in HFIP has been used. The proper procedure and evaluation are known by the skilled person.

Figure 2:
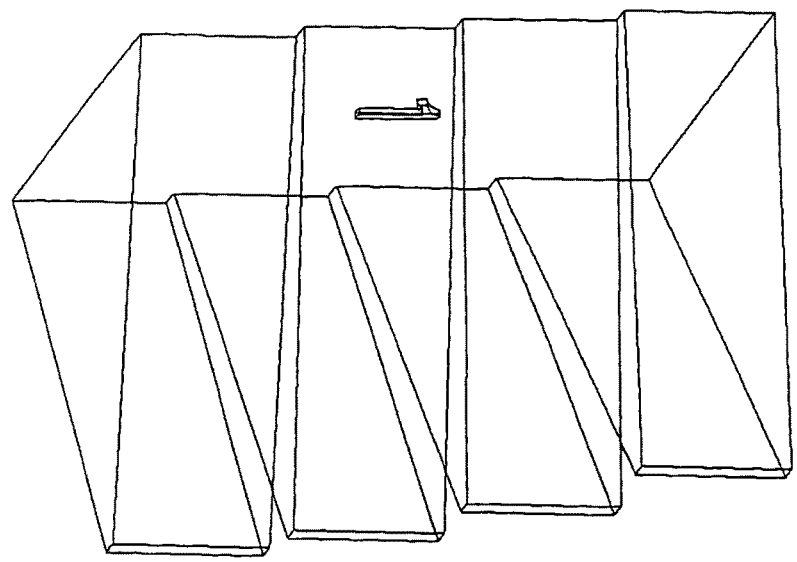
FIG. 2 shows a test geometry of a piece to be laser sintered.

The treated powder is then used for a new laser sintering process. The laser sintering pieces manufactured by the treated primepart-powder (laser sintering machine EOS P380, parameters mechanics, compromise, surface, for instance) has, in accordance to the location in the built-up area, noticeably less or no sink marks anymore as compared with waste powder. The check of the tendency of sink marks can be checked during laser sintering by a relative simple wedge test geometry having different inclined slopes of at least 15-30°, and preferably of 0-50°. In this respect, 0° corresponds to a vertical plane in the Z-axis of the building space. The minimum size of the wedge is 45×25×30 mm (length×width×height). A typical test geometry is depicted in FIG. 2.

Figure 3:
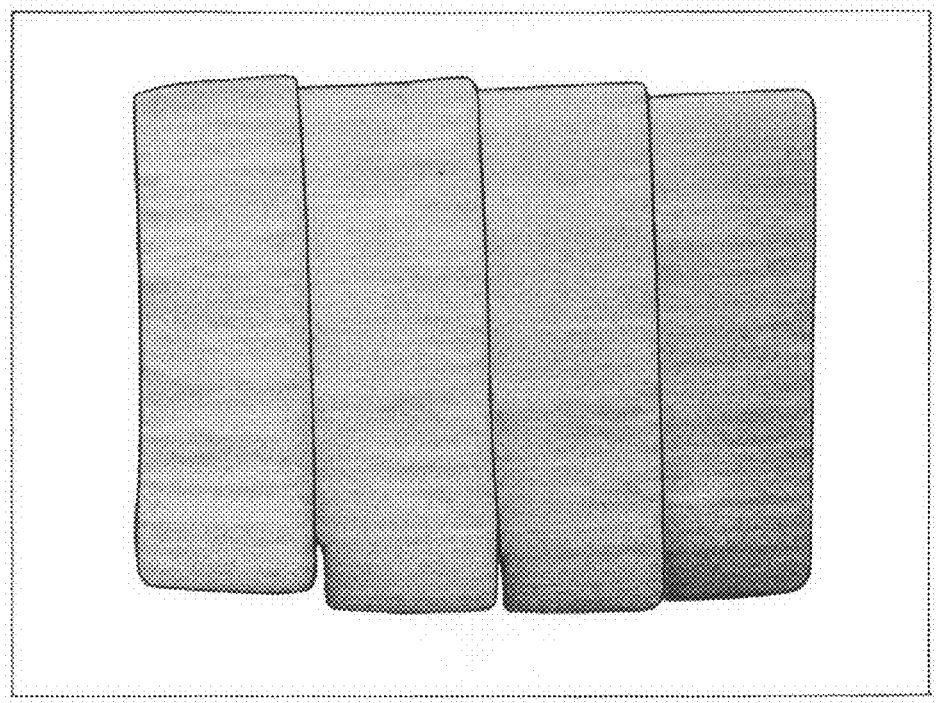
FIG. 3 shows a piece which is laser sintered of 100% waste powder.
Figure 4:
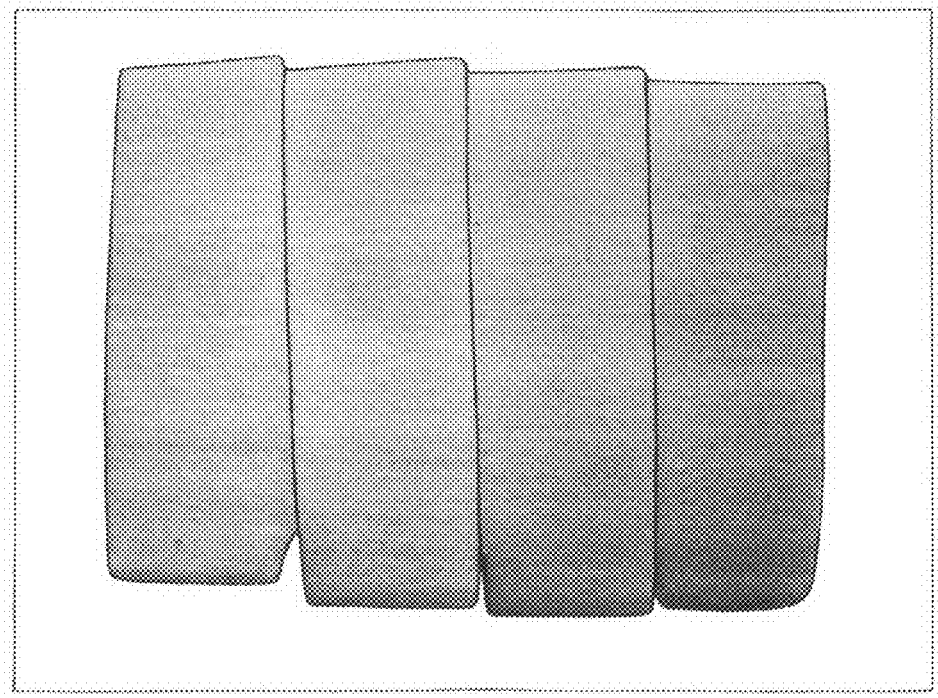
FIG. 4 shows a laser sintered piece having no sink marks anymore and which is manufactured by the method of the present invention by recycled waste powder.

FIG. 3 shows a laser sintered piece manufactured of 100% waste powder of polyamide. The sink marks are clearly shown. FIG. 4 shows a laser sintered piece having the same geometry, wherein the powder has been subjected to the above mentioned treatment. Sink marks are not present.

By the treatment of the waste powder, the melting point and the crystallization point, respectively, of the powder nearly remain constant or is slightly lowered. Generally, the decrease is 0-5° C. The melting- and crystallization point of the powder can be determined by dynamic difference calorimetry (DKK and DSC, respectively) according to DIN 53765.

The treatment can either be conducted by the user of the laser sintering machine in the treatment device 12 or by a central unit comprising the treatment device 12 and receiving the waste powder for recycling.

The method is not restricted to the use of polyamide-12. Other aliphatic polyamide such as polyamide-6, polyamide-11, polyamide-46, polyamide-66, polyamide-1010, polyamide-1012, polyamide-1212 as well as their copolymers and other partly aromatic polyamide such as polyamide-PA6T/6I, poly-M-xylylenadipinamide (PAMXD6), polyamide-6/6T, polyamide-PA6T/66, -PA4T/46 can be used as well. As a matter of principle, all polyamides can be used where an increase in the molar weight of non-solidified powder occurs by post-condensation during the laser sintering process in the process chamber.

The method is also applicable to all plastic powders, where the non-solidified powder is subjected to an aging process in the process chamber resulting to a shift of the ratio of carboxylic end groups and amino end groups.

The method and the device are not restricted to the laser sintering method and the laser sintering device, either. As a matter of principle, they are applicable to all methods of layerwise manufacturing a three-dimensional object, where conditions (high temperatures) act on the non-solidified powder in the process chamber which makes the powder aging. Further examples for these methods are mask sintering and electron beam sintering.

The method is not restricted to a treatment only by water or water vapour. It is also possible to add further additives such as condensation catalysts or amide generating chain regulators in the treatment. Such catalysts and regulators are well-known by the skilled person.

The invention claimed is:

1. A recycled polyamide powder for use in a method of manufacturing a three-dimensional object by selectively solidifying layers of the recycled polyamide powder at the locations corresponding to the cross-section of the object in the respective layer by application of electromagnetic radiation, wherein the recycled polyamide powder has already undergone a manufacturing cycle and, prior to a further use in another manufacturing cycle, the powder is treated subsequently with water vapour and then the powder is dried, wherein after treatment the powder has a molar weight that is at least 5% less than before treatment.

2. The polyamide powder according to claim 1, further having a molar weight Mn (numeric average) of more than about 20,000 g/mol and a Mw (weight average) of more than about 40,000 g/mol. before the treatment with water vapour.

3. The polyamide powder according to claim 1, further having a molar weight Mn (numeric average) of 21,000-100,000 g/mol and a Mw (weight average) of 45,000-200,000 g/mol. before the treatment with water vapour.

4. The polyamide powder according to claim 1, further having a molar weight Mn (numeric average) of 22,000-50,000 g/mol and a Mw (weight average) of 50,000-150,000 g/mol. before the treatment with water vapour.

5. The polyamide powder according to claim 1, further having a molar weight Mn (numeric average) of 25,000-35,000 g/mol and a Mw (weight average) of 60,000-100,000 g/mol. before the treatment with water vapour.

6. The polyamide powder according to claim 1, further comprising an excess of carboxylic end groups relative to amino end groups of at least 4:1 up to at most 200:1 before the treatment with water vapour.

7. The polyamide powder according to claim 1, wherein after treatment the powder has a molar weight that is 10-70% less than before treatment.

8. The polyamide powder according to claim 1, wherein after treatment the powder has a molar weight that is 20-50% less than before treatment.

9. The polyamide powder according to claim 1, further comprising a molar weight (numeric average) after the treatment of less than about 40,000 g/mol and a $M_w$ (weight average) of less than about 100,000 g/mol.

10. The polyamide powder according to claim 9, further comprising an excess of carboxylic end groups relative to amino end groups after the treatment of about 2:1 up to about 3:1.

11. The polyamide powder according to claim 1, further comprising a molar weight (numeric average) after the treatment of 15,000-30,000 g/mol and a $M_w$ (weight average) of 35,000-70,000 g/mol.

12. The polyamide powder according to claim 1, further comprising a molar weight (numeric average) after the treatment of 17,000-25,000 g/mol and a $M_w$ (weight average) of 37,000-50,000 g/mol.

13. The polyamide powder according to claim 1, further comprising a molar weight (numeric average) after the treatment of 19,000-21,000 g/mol and a $M_w$ (weight average) of 38,000-45,000 g/mol.

14. The polyamide powder according to claim 1, further comprising an excess of carboxylic end groups relative to amino end groups after the treatment of about 2:1 up to about 3:1.

\* \* \* \* \*